US007746784B2

(12) United States Patent
de Heer

(10) Patent No.: US 7,746,784 B2
(45) Date of Patent: Jun. 29, 2010

(54) METHOD AND APPARATUS FOR IMPROVING TRAFFIC DISTRIBUTION IN LOAD-BALANCING NETWORKS

(75) Inventor: Arie Johannes de Heer, Hengelo (NL)

(73) Assignee: Alcatel-Lucent USA Inc., Murray Hill, NJ (US)

(*) Notice: Subject to any disclaimer, the term of this patent is extended or adjusted under 35 U.S.C. 154(b) by 898 days.

(21) Appl. No.: 11/387,165

(22) Filed: Mar. 23, 2006

(65) Prior Publication Data
US 2007/0223377 A1 Sep. 27, 2007

(51) Int. Cl.
*H04J 1/16* (2006.01)
(52) U.S. Cl. .................................... 370/235; 370/229
(58) Field of Classification Search ................ 370/217, 370/25, 229, 230, 231, 232, 233, 234, 235.1, 370/236, 236.1, 236.2, 237, 238, 239, 240, 370/413, 338, 394, 389, 392, 393, 401, 414, 370/415, 416, 395.43, 412; 709/238, 239, 709/242; 455/453, 466
See application file for complete search history.

(56) References Cited

U.S. PATENT DOCUMENTS

| | | | | |
|---|---|---|---|---|
| 5,115,495 | A * | 5/1992 | Tsuchiya et al. | 709/239 |
| 5,737,313 | A * | 4/1998 | Kolarov et al. | 370/234 |
| 6,014,567 | A * | 1/2000 | Budka | 455/453 |
| 6,424,624 | B1 * | 7/2002 | Galand et al. | 370/231 |
| 6,445,707 | B1 * | 9/2002 | Iuoras et al. | 370/395.43 |
| 6,456,590 | B1 * | 9/2002 | Ren et al. | 370/229 |
| 6,788,686 | B1 * | 9/2004 | Khotimsky et al. | 370/394 |
| 6,894,973 | B1 * | 5/2005 | Mishra | 370/229 |
| 6,973,032 | B1 * | 12/2005 | Casley et al. | 370/230 |
| 7,218,606 | B2 * | 5/2007 | Soumiya | 370/217 |
| 7,321,554 | B1 * | 1/2008 | Walsh et al. | 370/230 |
| 7,539,133 | B2 * | 5/2009 | van Haalen et al. | 370/229 |
| 7,599,292 | B1 * | 10/2009 | Gupta et al. | 370/235 |
| 2002/0039362 | A1 * | 4/2002 | Fisher et al. | 370/387 |
| 2002/0167954 | A1 * | 11/2002 | Highsmith et al. | 370/406 |
| 2003/0009560 | A1 * | 1/2003 | Venkitaraman et al. | 709/226 |
| 2003/0017831 | A1 * | 1/2003 | Lee et al. | 455/453 |
| 2003/0058880 | A1 * | 3/2003 | Sarkinen et al. | 370/413 |
| 2003/0128687 | A1 * | 7/2003 | Worfolk et al. | 370/351 |

(Continued)

OTHER PUBLICATIONS

U.S. Appl. No. 10/785,352, filed Feb. 24, 2004, Nagesh et al.

*Primary Examiner*—Frank Duong
*Assistant Examiner*—Abdullah Riyami
(74) *Attorney, Agent, or Firm*—Wall & Tong, LLP

(57) ABSTRACT

The invention includes a method and apparatus for balancing traffic in a load-balancing network having a plurality of nodes. The method includes splitting a traffic flow into a plurality of traffic flow parts associated with designated ones of the plurality of nodes and distributing the traffic flow parts to the designated ones of the plurality of nodes in a first traffic distribution round, wherein each of the designated nodes routes at least a portion of the received traffic flow part to one or more of the plurality of nodes in a second traffic distribution round. The traffic flow is split according to a congestion status associated with each of the plurality of nodes. The congestion status associated with each of the plurality of nodes is determined using congestion status messages distributed by each of the plurality of nodes in response to congestion conditions.

16 Claims, 7 Drawing Sheets

U.S. PATENT DOCUMENTS

| | | | |
|---|---|---|---|
| 2003/0147385 A1* | 8/2003 | Montalvo et al. | 370/389 |
| 2003/0174648 A1* | 9/2003 | Wang et al. | 370/235 |
| 2003/0236887 A1* | 12/2003 | Kesselman et al. | 709/226 |
| 2004/0032872 A1* | 2/2004 | Dhara | 370/401 |
| 2005/0002334 A1* | 1/2005 | Chao et al. | 370/230 |
| 2005/0182849 A1* | 8/2005 | Chandrayana et al. | 709/235 |
| 2005/0246452 A1* | 11/2005 | Spencer et al. | 709/250 |
| 2005/0265255 A1* | 12/2005 | Kodialam et al. | 370/252 |
| 2007/0121499 A1* | 5/2007 | Pal et al. | 370/230 |
| 2007/0153702 A1* | 7/2007 | Khan Alicherry et al. | 370/252 |
| 2007/0177506 A1* | 8/2007 | Singer et al. | 370/235 |
| 2007/0223372 A1* | 9/2007 | Haalen et al. | 370/229 |
| 2007/0268841 A1* | 11/2007 | Dube et al. | 370/254 |
| 2008/0056178 A1* | 3/2008 | Alexander et al. | 370/328 |
| 2008/0112400 A1* | 5/2008 | Dunbar et al. | 370/360 |
| 2008/0165678 A1* | 7/2008 | Trinh et al. | 370/229 |
| 2008/0228942 A1* | 9/2008 | Lor et al. | 709/238 |

* cited by examiner

METHOD AND APPARATUS FOR IMPROVING TRAFFIC DISTRIBUTION IN LOAD-BALANCING NETWORKS

FIELD OF THE INVENTION

The invention relates to the field of communication networks and, more specifically, to controlling traffic distribution in load-balancing networks.

BACKGROUND OF THE INVENTION

In general, load-balancing networks include load-balancing nodes configured for dynamically balancing traffic flow between networks. The load-balancing nodes typically include large queues. Since large queues may result in prolonged traffic queuing times, load-balancing nodes often require inclusion of large re-sequencing buffers. Disadvantageously, large queues and large re-sequencing buffers, as well as being expensive, often result in substantial traffic delays and traffic delay variations for traffic flowing through the load-balancing network.

SUMMARY OF THE INVENTION

Various deficiencies in the prior art are addressed through the invention of a method and apparatus for balancing traffic in a load-balancing network having a plurality of nodes. The method includes splitting a traffic flow into a plurality of traffic flow parts associated with designated ones of the plurality of nodes and distributing the traffic flow parts to the designated ones of the plurality of nodes in a first traffic distribution round, wherein each of the designated nodes routes at least a portion of the received traffic flow part to one or more of the plurality of nodes in a second traffic distribution round. The traffic flow is split according to a congestion status associated with each of the plurality of nodes.

The traffic flow may be split using any of a plurality of flow splitting schemes described herein, such as splitting the traffic flow substantially equally across uncongested nodes, splitting the traffic flow unequally across uncongested nodes, splitting the traffic flow unequally between uncongested nodes and congested nodes (and further splitting the traffic flow substantially equally or unequally across the respective groups of uncongested nodes and congested nodes), and like flow splitting schemes. The congestion status associated with each of the plurality of nodes is determined using congestion status messages distributed by each of the plurality of nodes in response to congestion conditions.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables flow distributors of load-balancing nodes of a load-balancing network to adapt flow splitting rules to the actual state of the network without requiring that the flow distributors know the global state of the network. In the absence of any congestion in a load-balancing network, each load-balancing node, operating as an ingress node, typically splits received traffic flows entering the load-balancing network in a manner for distributing substantially equal portions of the received traffic flows to each of the load-balancing nodes. The present invention, utilizing congestion status associated with each of the load-balancing nodes, adapts the splitting of the traffic flows to each of the load-balancing nodes. The congestion status is communicated between load-balancing nodes using feedback signals generated in response to detection of various conditions (e.g., node congested conditions, node uncongested conditions, and the like).

The present invention, in one embodiment, utilizing load-balancing node congestion status, adapts splitting of a received traffic flow to the load-balancing nodes such that substantially equal portions of the received traffic flow are distributed to each of the uncongested load-balancing nodes (i.e., no traffic flow is split for distribution to congested load-balancing nodes). The present invention, in one embodiment, utilizing load-balancing node congestion status, adapts splitting of a received traffic flow to the load-balancing nodes such that first portions of the received traffic flow are distributed to each of the uncongested load-balancing nodes and second portions of the received traffic flow are distributed to each of the congested load-balancing nodes (e.g., an average amount of traffic flow split for distribution to uncongested load-balancing nodes is greater than an average amount of traffic flow split for distribution to congested load-balancing nodes).

Figure 1:
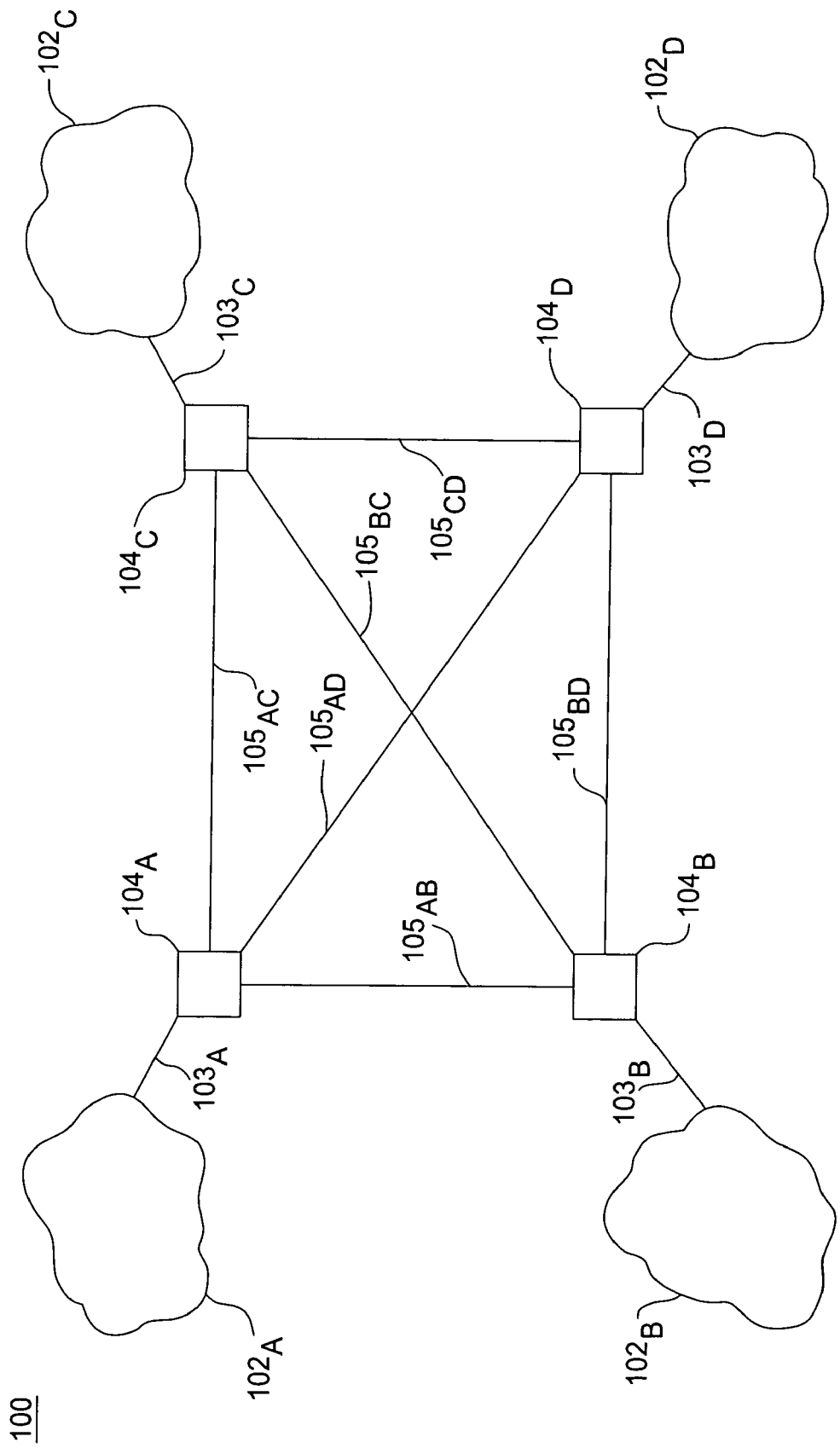
FIG. 1 depicts a high-level block diagram of a communication network.

FIG. 1 depicts a high-level block diagram of a communication network. As depicted in FIG. 1, communication network 100 includes a plurality of networks $102_A$, $102_B$, $102_C$, and $102_D$ (collectively, networks 102) and a plurality of nodes $104_A$, $104_B$, $104_C$, and $104_D$ (collectively, nodes 104). The networks $102_A$, $102_B$, $102_C$, and $102_D$ communicate with nodes $104_A$, $104_B$, $104_C$, and $104_D$, respectively, using a plurality of links $103_A$, $103_B$, $103_C$, and $103_D$ (collectively, links 103), respectively. In FIG. 1, nodes $104_A$ and $104_B$ communicate using a link $105_{AB}$, nodes $104_A$ and $104_C$ communicate using a link $105_{AC}$, nodes $104_A$ and $104_D$ communicate using a link $105_{AD}$, nodes $104_B$ and $104_C$ communicate using a link $105_{BC}$, nodes $104_B$ and $104_D$ communicate using a link $105_{BD}$, nodes $104_C$ and $104_D$ communicate using a link $105_{CD}$. The links $105_{AB}$, $105_{AC}$, $105_{AD}$, $105_{BC}$, $105_{BD}$, and $105_{CD}$ are collectively denoted as links 105. The nodes 104 and links 105 collectively form a load-balancing network.

As depicted in FIG. 1, networks 102 include communication networks operable for supporting any communications. In one embodiment, networks 102 include packet-based networks. In one such embodiment, networks 102 include at least one of Ethernet networks, Internet Protocol (IP) networks, Multi-protocol Label Switching (MPLS) networks, and the like, as well as various combinations thereof. As depicted in FIG. 1, nodes 104 include nodes operable for supporting any communications supported by networks 102. As such, networks 102 and associated nodes 104 are operable for supporting various communication traffic types such as Ethernet traffic, IP traffic, MPLS traffic, and the like, as well as various combinations thereof. As depicted in FIG. 1, networks 102 exchange traffic using a load-balancing network.

As depicted in FIG. 1, nodes 104, operating as load-balancing nodes for dynamically balancing traffic between networks 102, and associated links 105, collectively form a load-balancing network. For the load-balancing network, ingress traffic speeds entering the load-balancing network and egress traffic speeds leaving the load-balancing network are known, however, traffic within the load-balancing network (i.e., traffic exchanged between nodes 104 using links 105) is unknown. In one embodiment, since the load-balancing network distributes traffic load entering the load-balancing network from networks 102 substantially equally over nodes 104, all possible traffic matrices may be supported.

As depicted in FIG. 1, nodes 104 operate as ingress nodes, intermediate nodes, and egress nodes. For traffic entering the load-balancing network from networks 102, associated nodes 104 operate as ingress nodes. For traffic leaving the load-balancing network toward networks 102, associated nodes 104 operate as egress nodes. For traffic traversing the load-balancing network (i.e., from ingress node to egress node), nodes 104 operate as intermediate nodes. In one embodiment, traffic routing within the load-balancing network (i.e., between networks 102) is performed according to distribution rounds. In one such embodiment, traffic routing between an ingress node (illustratively, one of the nodes 104) and an egress node (illustratively, one of the nodes 104) is performed using two traffic distribution rounds.

In a first distribution round, at each node 104, packets entering the load-balancing network from associated networks 102 are evenly distributed to each of the nodes 104. For example, incoming packets originating from network $102_A$ (and destined for network $102_B$) are evenly distributed by node $104_A$ to each of nodes $104_A$, $104_B$, $104_C$, and $104_D$. In a second distribution round, at each node 104, packets received during the first distribution round are forwarded to nodes 104 according to the networks 102 for which each packet is destined. For example, packets entering the load-balancing network at node $104_A$ and destined for network $102_B$, after being evenly distributed by node $104_A$ to nodes $104_A$, $104_B$, $104_C$, and $104_D$ in the first distribution round, are routed from nodes $104_A$, $104_B$, $104_C$, and $104_D$ to node $104_B$ in the second distribution round.

Although depicted and described herein as dynamically balancing traffic between a specific number of networks, a load-balancing network may dynamically balance traffic between fewer or more networks. Although depicted and described herein as having a specific configuration, a load-balancing network may be implemented using fewer or more load-balancing nodes, as well as a different load-balancing node configuration. Although, for purposes of clarity, each link 103 and link 105 is depicted using a single physical link, each link may 103 and link 105 may include a plurality of physical links.

Figure 2:
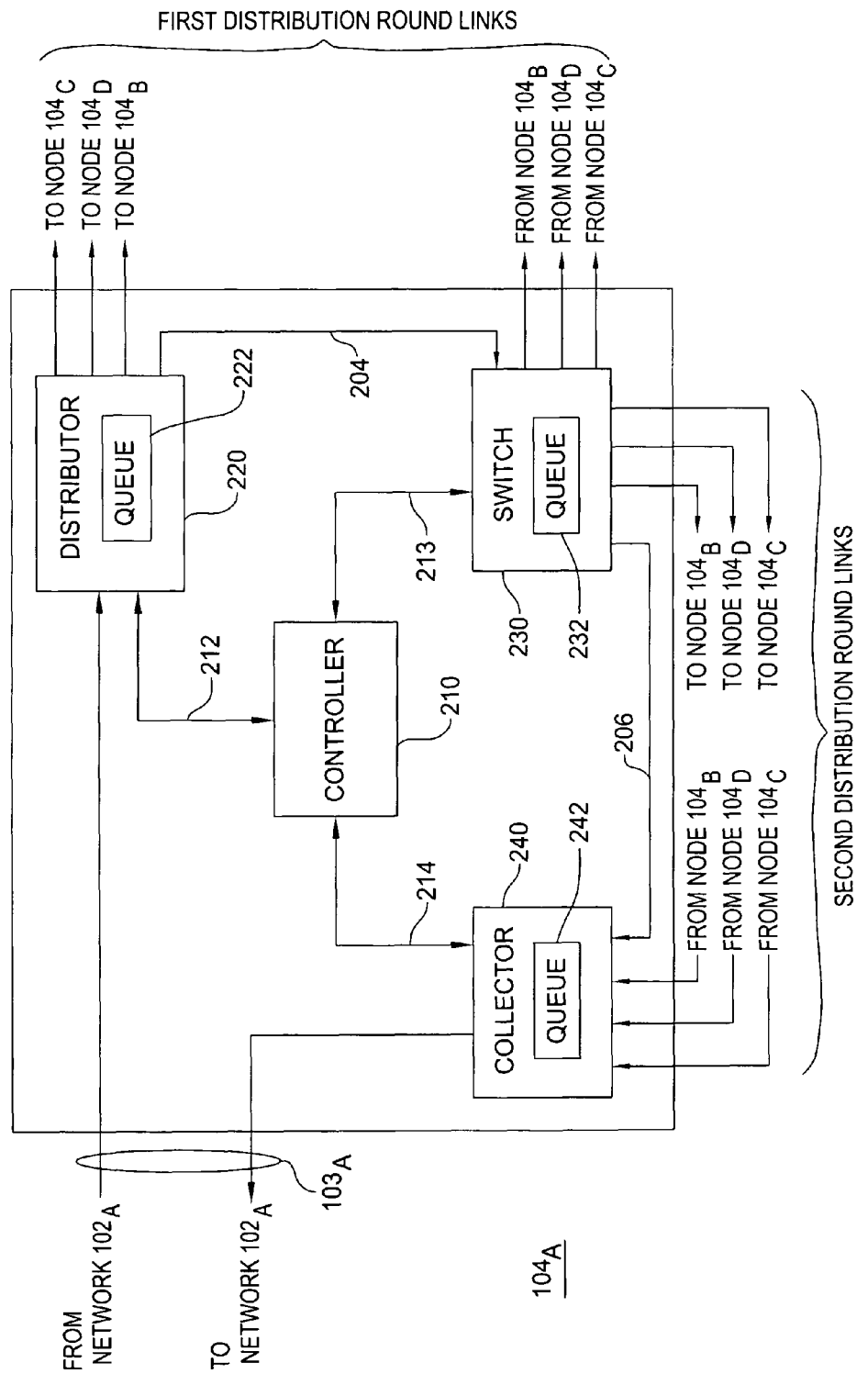
FIG. 2 depicts a high-level block diagram of a network element of the communication network of FIG. 1.

FIG. 2 depicts a high-level block diagram of a load-balancing node of the communication network of FIG. 1 (illustratively, node $104_A$). As depicted in FIG. 2, node $104_A$ includes a controller 210, a distributor 220, a switch 230, and a collector 240. In one embodiment, distributor 220 optionally includes a distributor queue 222, switch 230 optionally includes a switch queue 232, and collector 240 optionally includes a collector queue 242. In one embodiment, node $104_A$ optionally includes a memory 250 associated with controller 210. Although not depicted, node $104_A$ may include various other input modules, output modules, processor modules, memory modules, support circuits, and the like, as well as various combinations thereof.

As depicted in FIG. 2, distributor 220 is coupled to network $102_A$ via link $103_A$. The distributor 220 is coupled to nodes $104_B$, $104_C$, and $104_D$ via links $105_{AB}$, $105_{AC}$, and $105_{AD}$, and to switch 230 via an internal link 204. The switch 230 is coupled to nodes $104_B$, $104_C$, and $104_D$ via links $105_{AB}$, $105_{AC}$, and $105_{AD}$, and to distributor 240 via a link 206. The collector 240 is coupled to nodes $104_B$, $104_C$, and $104_D$ via links $105_{AB}$, $105_{AC}$, and $105_{AD}$, and to network $102_A$ via link $103_A$. As depicted in FIG. 2, controller 210 communicates with distributor 220 using an internal link 212, with switch 230 using an internal link 214, and with collector 240 using an internal link 216. For purposes of clarity in discussing functions associated with distributor 220, switch 230, and collector 240 with respect to traffic distribution rounds, links $105_{AB}$, $105_{AC}$, and $105_{AD}$ are logically depicted and described herein with respect to FIG. 2.

As depicted in FIG. 2, distributor 220 receives traffic (e.g., a traffic flow including a plurality of packets) from network $102_A$ via link $103_A$. The traffic flow received by distributor 220 may include packets destined for any of networks 102. The traffic flow received by distributor 220 is split into a plurality of traffic flow parts. In one embodiment, the received traffic flow is split into a plurality of traffic flow parts using one or more flow splitting rules. In one embodiment, distributor 220 splits the received traffic flow into a plurality of traffic flow parts (each traffic flow part including one or more packets). In one embodiment, distributor 220 splits the received traffic flow into a plurality of traffic flow parts using flow splitting rules maintained by distributor 220. In one embodiment, distributor 220 splits the received traffic flow into a plurality of traffic flow parts using flow splitting rules maintained by controller 210 (e.g., controller 210 controls splitting of traffic flows by the distributor 220).

In one embodiment, flow splitting rules for use in determining splitting of a received traffic flow into a plurality of traffic flow parts may be determined using flow splitting information. In one embodiment, flow splitting information stored by each of the nodes 104 may be generated by one or more of the distributors, switches, and collectors of one or more of the nodes 104, or various other components associated with distributors, switches, and collectors of one or more of the nodes 104, and the like, as well as various combinations thereof. In one embodiment, flow splitting information includes node congestion status information.

In one embodiment, node congestion status information provides an indication as to whether a node is currently congested (e.g., a congestion condition exists for the node) or uncongested (e.g., a congestion condition does not exist for the node). In one embodiment, node congestion status information includes a node congestion level (e.g., uncongested, lightly congested, moderately congested, heavily congested, completely congested, and the like) associated with the node. In one embodiment, node congestion status information includes at least one of a congestion status associated with each of the nodes, a congestion status associated with at least a portion of the nodes, a list of currently congested nodes, a list of currently uncongested nodes, and the like, as well as various combinations thereof.

In one embodiment, node congestion status information is indicative of a node congestion change condition. In one embodiment, in which node congestion status information provides an indication as to whether a node is currently congested or uncongested, a node congestion change condition may be detected in response to a change from a node being congested to a node being uncongested or in response to a change from a node being uncongested to a node being congested. In one embodiment, in which node congestion status information includes a node congestion level, a node congestion change condition may be detected in response to a change from a first node congestion level to a second node congestion level (e.g., from moderately congested to heavily congested).

In one embodiment, a node congestion status information associated with a node is indicative of a queue utilization value associated with one of the queues of the node (e.g., associated with a distributor queue, a switch queue, a collector queue, and the like, as well as various other queues or memory devices associated with the node, as well as various combinations thereof). In one embodiment, a queue utilization value associated with a node is indicative of a queue utilization condition (e.g., a queue over-utilization condition, a queue under-utilization condition, and the like) associated with the node. In one embodiment, a queue utilization value associated with a node is indicative of a queue utilization level (e.g., a 70% queue utilization level, a 90% queue utilization level, and the like) associated with the node.

In one embodiment, congestion status information is generated by at least one of the nodes 104. In one such embodiment, congestion status information may be generated by one or more of the processors, distributors, switches, and collectors of one or more of the nodes 104, or various other components associated with processors, distributors, switches, collectors of one or more of the nodes 104, and the like, as well as various combinations thereof. In one embodiment, congestion status information may be conveyed using one or more congestion status messages generated by one or more of the processors, distributors, switches, and collectors of one or more of the nodes 104, or various other components associated with processors, distributors, switches, collectors of one or more of the nodes 104, and the like, as well as various combinations thereof.

In one embodiment, upon detection of a flow splitting modification condition by distributor 220, switch 230, or collector 240, the component detecting the flow splitting modification condition generates a plurality of flow splitting modification condition messages for distribution to nodes 104 (including node $104_A$). In one embodiment, in which distributor 220 generates the flow splitting modification condition messages, distributor 220 may distribute the flow splitting modification condition messages to nodes 104, or may provide the flow splitting modification condition messages to switch 230 (e,g., directly or via controller 210) for distribution to nodes 104. In one embodiment, in which switch 230 generates the flow splitting modification condition messages, switch 230 may distribute the flow splitting modification condition messages to nodes 104, or may provide the flow splitting modification condition messages to distributor 220 (e,g., directly or via controller 210) for distribution to nodes 104. In one embodiment, in which collector 240 generates the flow splitting modification condition messages, collector 240 may distribute the flow splitting modification condition messages to processor 210, distributor 220, or switch 230 for distribution to nodes 104.

In one embodiment, upon detection of a flow splitting modification condition by any of distributor 220, switch 230, or collector 240, or any other component of the load-balancing node, the component detecting the flow splitting modification condition notifies processor 210 of the detected flow splitting modification condition. In this embodiment, processor 210 may generate a plurality of flow splitting modification condition messages for distribution to nodes 104 (including processor 210 of node $104_A$, as well as similar processors associated with nodes $104_B$, $104_C$, and $104_D$). In this embodiment, processor 210 may forward the generated flow splitting modification condition messages to at least one of distributor 220 or switch 230, as well as like components adapted for communicating with nodes 104, for distributing the flow splitting modification condition messages to nodes 104.

For example, in one embodiment, upon detection of a queue overflow condition (or any other queue utilization condition) associated with any of distributor queue 222, switch queue 232, or collector queue 242 (by any of distributor 220, switch 230, and collector 240, respectively) the component detecting the queue overflow condition (or other condition) may notify processor 210 of the queue overflow condition. In this embodiment, processor 210 may generate a flow splitting modification condition message for distribution (using distributor 220) to nodes $104_B$, $104_C$, and $104_D$. In this embodiment, processor 210 may also store the flow splitting modification condition locally (as condition status information) for use by node $104_A$ in splitting traffic flows received from network $102_A$.

In one embodiment, node congestion status information is stored by node $104_A$ (as well as each of nodes $104_B$, $104_C$, and $104_D$). In one embodiment, congestion status information is stored on at least one of controller 210, distributor 220, memory 250, and the like, as well as various combinations thereof. In one embodiment, processor 210 retrieves congestion status information (e.g., locally or from another component of node $104_A$) for determining splitting of a received traffic flow into a plurality of traffic flow parts. In one embodiment, distributor 220 retrieves congestion status information (e.g., locally or from another component of node $104_A$) for determining splitting of a received traffic flow into a plurality of traffic flow parts. In one embodiment, congestion status information is stored by one or more other components of node $104_A$ (e.g., switch 230, collector 240, memory 250, and the like).

As depicted in FIG. 2, distributor 220 receives a traffic flow from network $102_A$ via link $103_A$. The received traffic flow may include packets destined for any of networks 102. The received traffic flow is split into a plurality of traffic flow parts. In one embodiment, the received traffic flow is split into a plurality of traffic flow parts using flow splitting rules. The distributor 220 distributes the traffic flow parts to at least a portion of nodes 104 of the load-balancing network according to the splitting of the traffic flow. The distributor 220 distributes traffic flow parts to nodes 104 independent of the node 104 by which the distributed traffic flow parts leave the load-balancing network (i.e., independent of the egress node associated with each traffic flow part). As described herein, distributor 220 distributes traffic flow parts to nodes 104 in a first traffic distribution round.

As described herein, in one embodiment, distributor 220 queues packets received from network $102_A$ prior to distribution of the packets in the first distribution round. In one such embodiment, in which distributor 220 receives packets from network $102_A$ at a rate faster than distributor 220 is distributing the received packets to nodes 104, utilization of distributor queue 222 increases. In this embodiment, depending upon such factors as the size of distributor queue 222, the length of time for which distributor traffic ingress rate exceeds distributor traffic egress rate, and like factors, distributor queue 222 may reach a queue utilization condition in which distributor 220 triggers generation of a flow splitting modification condition message for distribution to nodes 104 for use in modifying flow splitting rules associated with each of the nodes 104.

As depicted in FIG. 2, switch 230 receives traffic flow parts from nodes 104 in the first distribution round and transmits traffic flow parts to nodes 104 in a second distribution round. In a first distribution round, switch 230 receives traffic flow parts from nodes 104 (i.e., from distributor 220 of node $104_A$ via internal link 204, as well as from similar distributors associated with nodes $104_B$, $104_C$, and $104_D$ (not depicted) via associated links $105_{AB}$, $105_{AC}$, and $105_{AD}$. The traffic flow parts received by switch 230 are received independent of the associated egress nodes. In a second distribution round, switch 230 transits traffic flow parts towards nodes 104 (i.e., toward collector 240 of node $104_A$ via internal link 206, as well as toward similar collectors associated with nodes $104_B$, $104_C$, and $104_D$ (not depicted) via associated links $105_{AB}$, $105_{AC}$, and $105_{AD}$. The traffic flow parts transmitted by switch 230 are transmitted according to the associated egress nodes.

As described herein, distribution rounds are associated with packets (not nodes). In other words, the first distribution round of a traffic flow part refers to transmission of the traffic flow part from a distributor of an ingress node to a switch of an intermediate node (and, similarly, receipt of the traffic flow part by the switch of the intermediate node), and the second distribution round of a packet refers to transmission of the traffic flow part from the switch of the intermediate node to a collector of an egress node (and, similarly, receipt of the traffic flow part by the collector of the egress node). As such, traffic flow parts distributed by switch 230 in a current second distribution round include traffic flow part received by switch 230 in a previous first distribution round.

As described herein, switch 230 receives packets from nodes 104 in a first traffic distribution round. In one embodiment, switch 230 queues packets received from nodes 104 in the first distribution round in switch queue 232 prior to distribution of the packets to nodes 104 in the second distribution round. In one such embodiment, in which switch 230 receives packets from nodes 104 at a rate faster than switch 230 is transmitting the received packets to nodes 104, utilization of switch queue 232 increases. In this embodiment, depending upon such factors as the size of switch queue 222, the length of time for which switch traffic ingress rate exceeds switch traffic egress rate, and like factors, switch queue 222 may reach a queue utilization condition in which switch 230 triggers generation of a flow splitting modification condition message for distribution to nodes 104 for use in modifying flow splitting rules associated with each of the nodes 104.

As described herein, switch 230 transmits traffic flow parts to nodes 104 in a second traffic distribution round. In one embodiment, unlike distributor 220 which distributes traffic flow parts to nodes 104 independent of the egress nodes associated with the traffic flow parts, switch 230 transmits traffic flow parts to nodes 104 according to the egress nodes associated with the packets. In other words, switch 230 performs switching for routing traffic flow parts received from distributors of ingress nodes (by which the traffic flow entered the load-balancing network) to collectors of egress nodes (by which the traffic flow parts are assigned to leave the load-balancing network). In one such embodiment, switch 230 queries at least one switching table for each traffic flow part received in the first distribution round for determining the egress node associated with each received traffic flow part.

As depicted in FIG. 2, collector 240 receives packets in the second distribution round. In particular, in the second distribution round, collector 240 receives packets from nodes 104 (i.e., from switch 230 of node $104_A$ via internal link 206, as well as from similar switches associated with nodes $104_B$, $104_C$, and $104_D$ (not depicted) via associated links $105_{AB}$, $105_{AC}$, and $105_{AD}$). As depicted in FIG. 2, collector 240 forwards received packets toward network $102_A$ using associated link $103_A$. As such, for packets received by associated collectors (illustratively, collector 240 of node $104_A$), nodes 104 operate as egress nodes of the load-balancing network.

In one embodiment, collector 240 queues packets received from nodes 104 in collector queue 242 prior to forwarding of the packets toward network $102_A$. In one such embodiment, in which collector 240 receives packets from nodes 104 at a rate faster than collector 240 is forwarding the received packets toward network $102_A$, utilization of collector queue 242 increases. In this embodiment, depending upon such factors as the size of collector queue 242, the length of time for which collector traffic ingress rate exceeds collector traffic egress rate, and like factors, collector queue 242 may reach a queue utilization condition in which collector 240 triggers generation of a flow splitting modification condition message for distribution to nodes 104 for use in modifying flow splitting rules associated with each of the nodes 104.

Figure 3:
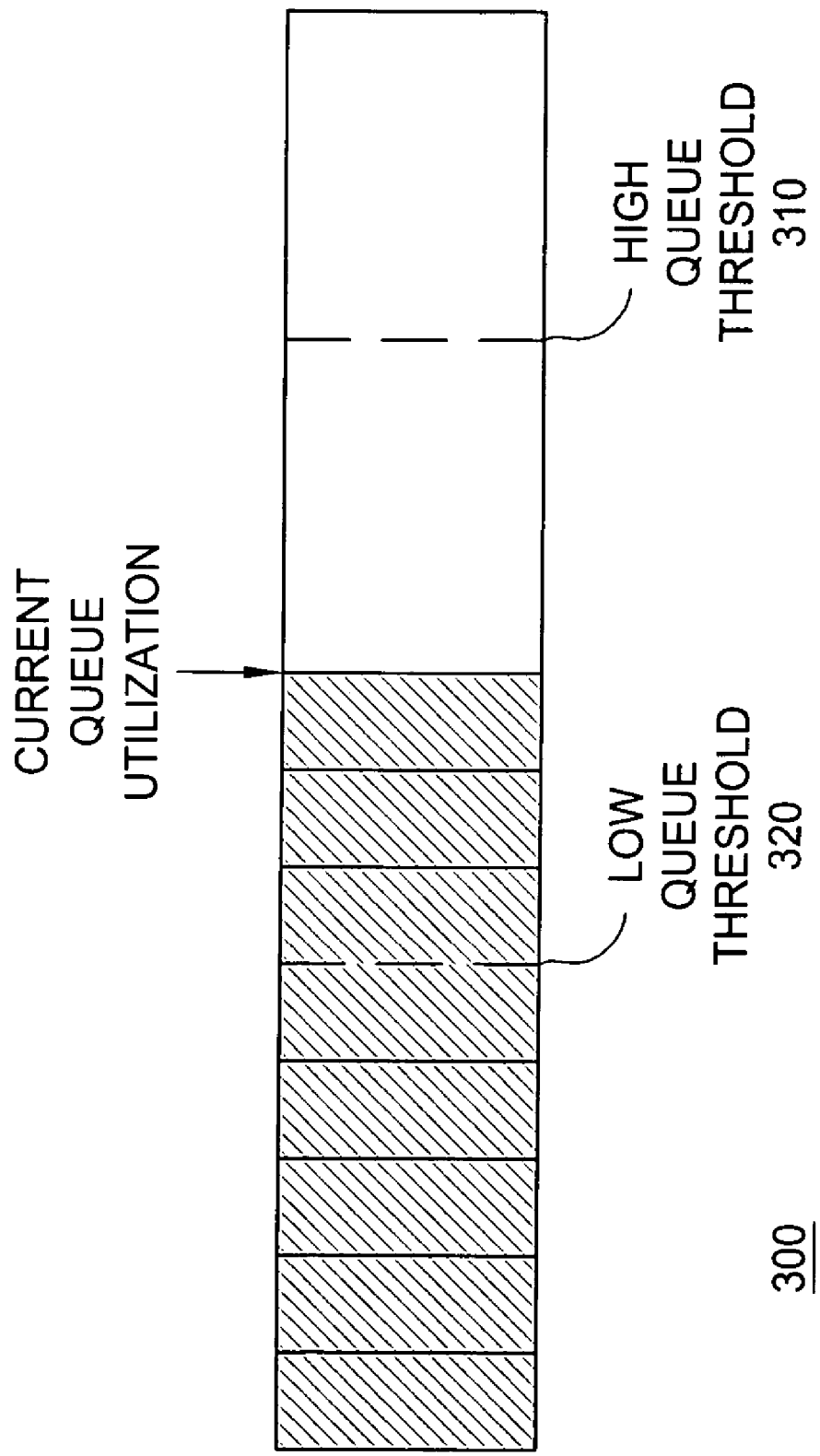
FIG. 3 depicts a queue of a network element of the communication network of FIG. 1.

FIG. 3 depicts a queue of a network element of the communication network of FIG. 1. Specifically, queue 300 of FIG. 3 comprises a queue associated with one or more of the functional components of a load-balancing node. For example, queue 300 may include a distributor queue, a switch queue, a collector queue, or a queue associated with a combination of a distributor, a switch, a collector, or like components of a load-balancing node, as well as various combinations thereof. As described herein, one or more queues associated with each load-balancing node are monitored for generating feedback signals for controlling distribution of traffic in the load-balancing network. In one embodiment, queue 300 may be monitored by the component of the load-balancing node with which queue 300 is associated (e.g., a switch queue may be monitored by the associated switch module).

As described herein, queue 300 may be monitored according to one or more queue monitoring parameters. In one embodiment, queue 300 may be monitored according to queue utilization. As described herein, queue utilization is a measure of an amount of total queue storage space that is currently utilized for storing information. The queue utilization may be represented as an amount of occupied memory, a percentage of occupied memory, and the like. For example, a queue having a total queue storage space of 100 bytes which is currently storing seven 10-byte packets has a queue utilization of 70%. Although primarily described herein with respect to queue utilization, in one embodiment, queue availability may be used together with, or, alternatively, in place of, queue utilization, as a measure for monitoring queue 300 for controlling traffic distribution in the load-balancing network.

As depicted in FIG. 3, queue 300 is monitored according to a high queue threshold 310 and a low queue threshold 320. As described herein, in one embodiment, high queue threshold 310 and low queue threshold 320 may be represented using one or more of queue utilization values, queue availability values, and the like, as well as various combinations thereof. In one embodiment, in which high queue threshold 310 and low queue threshold 320 are represented using queue utilization values, a current queue utilization of queue 300 is monitored for comparison with high queue threshold 310 and low queue threshold 320. In one embodiment, current queue utilization of queue 300 is continuously monitored for comparison with high queue threshold 310 and low queue threshold 320. In one embodiment, current queue utilization of queue 300 is periodically monitored for comparison with high queue threshold 310 and low queue threshold 320.

In one embodiment, upon detecting that current queue utilization is greater than or equal to the high queue threshold, a congestion detected feedback signal is generated. The congestion detected feedback signal is indicative that the associated node is congested (i.e., indicative of detection of a congestion condition). In one embodiment, upon detecting that current queue utilization is greater than or equal to the high queue threshold, a determination is made as to whether a congestion condition currently exists. In one such embodiment, a congestion detected feedback signal is only generated in response to a determination that a congestion condition does not currently exist. This embodiment prevents generation of multiple congestion detected feedback signals when current queue utilization fluctuates between being less than the high queue threshold and greater than the high queue threshold prior to being less than the low queue threshold (i.e., prior to clearing of a congestion condition).

In one embodiment, upon detecting that current queue utilization is less than or equal to the low queue threshold, a congestion cleared feedback signal is generated. The congestion cleared feedback signal is indicative that the associated node is not congested (i.e., indicative of clearing of a congestion condition). In one embodiment, upon detecting that current queue utilization is less than or equal to the low queue threshold, a determination is made as to whether a congestion condition currently exists. In one such embodiment, a congestion cleared feedback signal is only generated in response to a determination that a congestion condition does currently exist. This embodiment prevents generation of multiple congestion cleared feedback signals when the current queue utilization fluctuates between being greater than the low queue threshold and less than the low queue threshold prior to being greater than the higher queue threshold (i.e., prior to detecting of a congestion condition).

Figure 4:
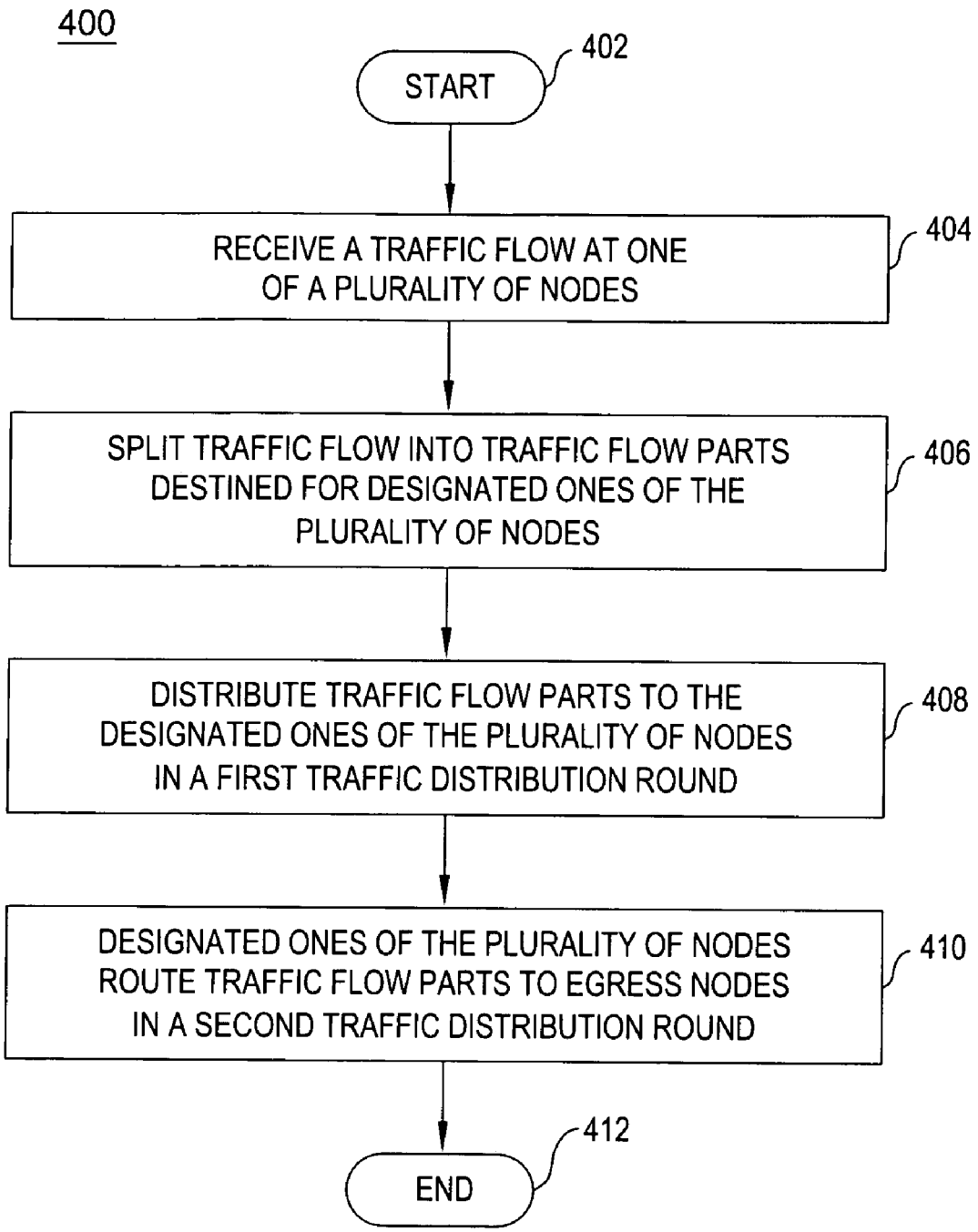
FIG. 4 depicts a method according to one embodiment of the present invention.

FIG. 4 depicts a method according to one embodiment of the present invention. Specifically, method 400 of FIG. 4 includes a method for controlling traffic flow splitting in a load-balancing network. Although described herein with respect to one of the plurality of load-balancing nodes of a load-balancing network, method 400 may be performed at each of the plurality of load-balancing nodes in a load-balancing network. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a traffic flow is received at one of a plurality of nodes. The node receiving the traffic flow from an associated network operates as an ingress node for receiving the traffic flow as the traffic flow enters the load-balancing network from the associated network. At step 406, the traffic flow is split into a plurality of traffic flow parts destined for designated ones of the plurality of nodes. The designated ones of the plurality of nodes operate as intermediate nodes for enabling the traffic flow parts to traverse the load-balancing network. In one embodiment, the received traffic flow is split into a plurality of traffic flow parts destined for designated ones of the plurality of nodes according to a congestion status associated with each of the plurality of nodes.

At step 408, the traffic flow parts are distributed to the designated ones of the plurality of nodes in a first traffic distribution round. At step 410, the designated ones of the plurality of nodes route traffic flow parts to specified ones of the plurality of nodes in a second traffic distribution round. The traffic flow parts are routed from the designated ones of the plurality of nodes to the specified ones of the plurality of nodes according to the destination (e.g., a network associated with one of the plurality of nodes) to which each of the traffic flow parts is assigned. The specified ones of the plurality of nodes operate as egress nodes for enabling the traffic flow parts to leave the load-balancing network. At step 412, method 400 ends.

Figure 5:
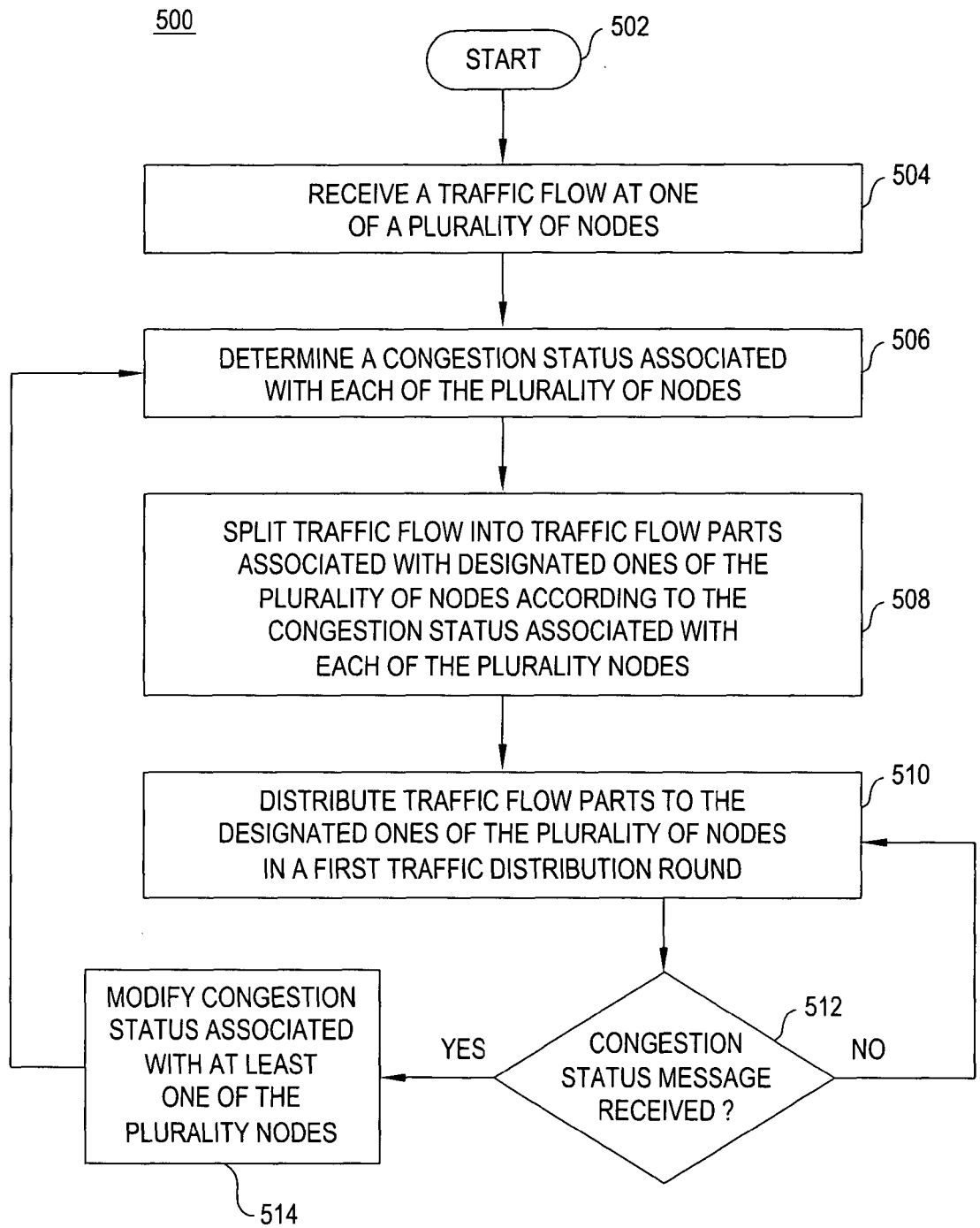
FIG. 5 depicts a method according to one embodiment of the present invention.

FIG. 5 depicts a method according to one embodiment of the present invention. In general, method 500 of FIG. 5 includes a method for controlling traffic flow splitting in a load-balancing network. In particular, method 500 of FIG. 5 includes a method for modifying congestion status associated with at least one of a plurality of load-balancing nodes for use in controlling splitting of traffic flows. Although described herein with respect to one of the plurality of load-balancing nodes of a load-balancing network, method 500 may be performed at each of the plurality of load-balancing nodes in a load-balancing network. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, a traffic flow is received at one of the plurality of nodes. At step 506, a congestion status associated with each of the plurality of nodes is determined. In one embodiment, congestion status values include congested and uncongested. In one embodiment, congestion status values may include a plurality of congestion levels. For example, five congestion levels may be defined for indicating varying levels of congestion on the associated node. At step 508, the traffic flow is split into a plurality of traffic flow parts associated with designated ones of the plurality of nodes according to the congestion status associated with each of the plurality of nodes. At step 510, the traffic flow parts are distributed to the designated ones of the plurality of nodes in a first traffic distribution round.

In one embodiment, in which congestion status of each node includes one of congested or uncongested, the traffic flow is split across the designated ones of the plurality of nodes for which the associated congestion status is uncongested (i.e., the traffic flow is not split across other nodes for which the associated congestion status is congested). In one such embodiment, the traffic flow is split across the uncongested nodes in a substantially equal manner. In another such embodiment, the traffic flow is split unequally across the uncongested nodes. In one further embodiment, the traffic flow is split unequally across the uncongested nodes according to at least one additional traffic splitting parameter.

In one embodiment, in which congestion status of each node includes one of congested or uncongested, the traffic flow is split across nodes for which the associated congestion status is uncongested as well as nodes which the associated congestion status is congested. In this embodiment, a first portion of the designated ones of the plurality of nodes comprises nodes for which the congestion status is indicative that the nodes are uncongested nodes and a second portion of the designated ones of the plurality of nodes comprises nodes for which the congestion status is indicative that the nodes are congested nodes. In this embodiment, traffic flow is split unequally across the congested nodes and uncongested nodes.

In one such embodiment, the traffic flow is split unequally across the congested nodes and uncongested nodes such that the portion of the traffic flow split across the uncongested nodes (i.e., a first traffic volume) is greater than the portion of the traffic volume split across the congested nodes (i.e., a second traffic volume). In this embodiment, a first average traffic volume split across each of the uncongested nodes is greater than a second average traffic volume split across each of the congested nodes. For example, in one embodiment, the traffic flow may be split unequally across the congested nodes and uncongested nodes such that 80% of the traffic flow is split across the uncongested nodes and 20% of the traffic flow is split across the congested nodes.

In one embodiment, in which the traffic flow is split unequally across the congested nodes and uncongested nodes, the portion of the traffic flow split across the uncongested nodes may be split substantially equally across the uncongested nodes. In one embodiment, in which the traffic flow is split unequally across the congested nodes and uncongested nodes, the portion of the traffic flow split across the uncongested nodes may be split unequally across the uncongested nodes. In one embodiment, the traffic flow is split unequally across the uncongested nodes according to at least one additional traffic splitting parameter.

In one embodiment, in which the traffic flow is split unequally across the congested nodes and uncongested nodes, the portion of the traffic flow split across the congested nodes may be split substantially equally across the congested nodes. In one embodiment, in which the traffic flow is split unequally across the congested nodes and uncongested nodes, the portion of the traffic flow split across the congested nodes may be split unequally across the congested nodes. In one embodiment, the traffic flow is split unequally across the congested nodes according to at least one additional traffic splitting parameter.

At step 512, a determination is made as to whether a congestion status message is received. If a congestion status message is not received, method 500 returns to step 510, and the traffic flow parts continue to be distributed to the designated ones of the plurality of nodes in the first traffic distribution round. If a congestion status message is received, method 500 proceeds to step 514. At step 514, congestion status associated with at least one of the plurality of nodes in the load-balancing network is modified according to a received congestion status message. The method 500 then returns to step 506, at which point the updated congestion status associated with each of the plurality of nodes is determined for splitting traffic flows.

Although, for purposes of clarity, depicted and described as monitoring for congestion status messages following distribution of traffic flow parts to the designated ones of the plurality of nodes in the first traffic distribution round, in one embodiment, monitoring for congestion status messages may be performed periodically (e.g., such that monitoring occurs at times other than immediately following distribution of traffic flow parts in a first traffic distribution round), continuously, and the like. In other words, in such embodiments, congestion status messages may be received and processed at any time for adapting the splitting of traffic flows (i.e., for adapting flow splitting rules).

Figure 6:
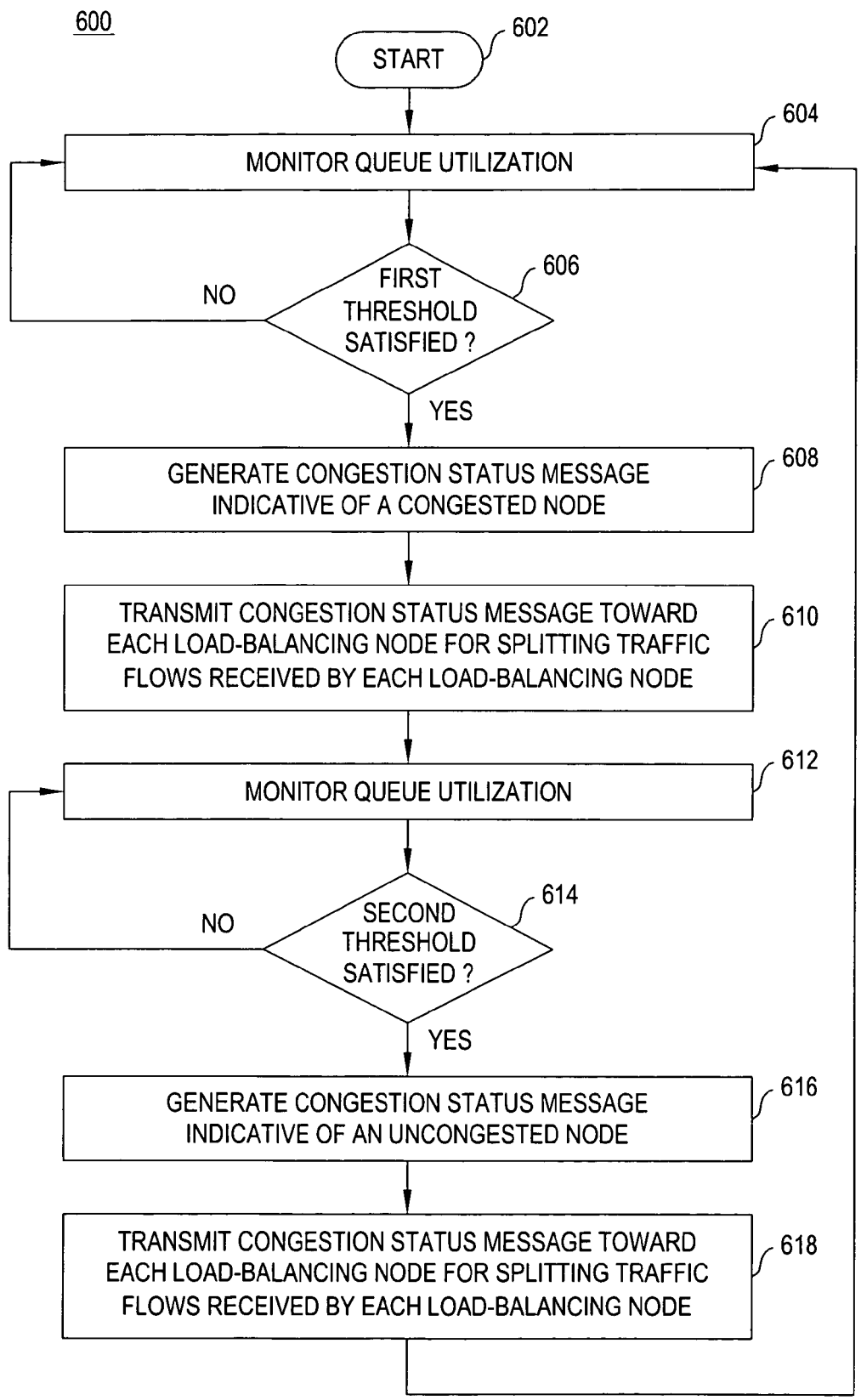
FIG. 6 depicts a method according to one embodiment of the present invention.

FIG. 6 depicts a method according to one embodiment of the present invention. In general, method 600 of FIG. 6 includes a method for controlling traffic flow splitting in a load-balancing network. In particular, method 600 of FIG. 6 includes a method for generating a congestion status message adapted for use by ingress load-balancing nodes in controlling splitting of traffic flows for distribution over the load-balancing network. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, queue utilization is monitored. At step 606, a determination is made as to whether a first threshold is satisfied. In one embodiment, depicted and described herein with respect to FIG. 3, the first threshold may be a queue utilization threshold level. In this embodiment, for example, a determination that the first threshold is satisfied may be detecting that the queue utilization has risen above 80% utilized. If the first threshold is not satisfied, method 600 returns to step 604 (i.e., monitoring of queue utilization continues for determining whether the first threshold is satisfied. If the first threshold is satisfied, method 600 proceeds to step 608.

At step 608, a congestion status message is generated. In one embodiment, the congestion status message is indicative of a congested node. In other words, in this embodiment, the congestion status message indicates that the load-balancing node on which the congestion status message is generated has switched from being uncongested (uncongested node) to being congested (congested node). At step 610, the congestion status message is transmitted toward each load-balancing node. The congestion status message received at each load-balancing node is used by each load-balancing node for splitting traffic flows received by each of the load-balancing nodes (for modifying the flow splitting rules associated with each load-balancing node in the load-balancing network).

At step 612, queue utilization is monitored. At step 614, a determination is made as to whether a second threshold is satisfied. In one embodiment, depicted and described herein with respect to FIG. 3, the second threshold may be a queue utilization threshold level. In this embodiment, for example, a determination that the first threshold is satisfied may be detecting that the queue utilization has fallen below 20% utilized. If the second threshold is not satisfied, method 600 returns to step 612 (i.e., monitoring of queue utilization continues for determining whether the second threshold is satisfied). If the second threshold is satisfied, method 600 proceeds to step 616.

At step 616, a congestion status message is generated. In one embodiment, the congestion status message is indicative of an uncongested node. In other words, in this embodiment, the congestion status message indicates that the load-balancing node on which the congestion status message is generated has switched from being congested (congested node) to being uncongested (uncongested node). At step 610, the congestion status message is transmitted toward each load-balancing node. The congestion status message received at each load-balancing node is used by each load-balancing node for splitting traffic flows received by each of the load-balancing nodes (i.e., for modifying the flow splitting rules associated with each load-balancing node in the load-balancing network).

Figure 7:
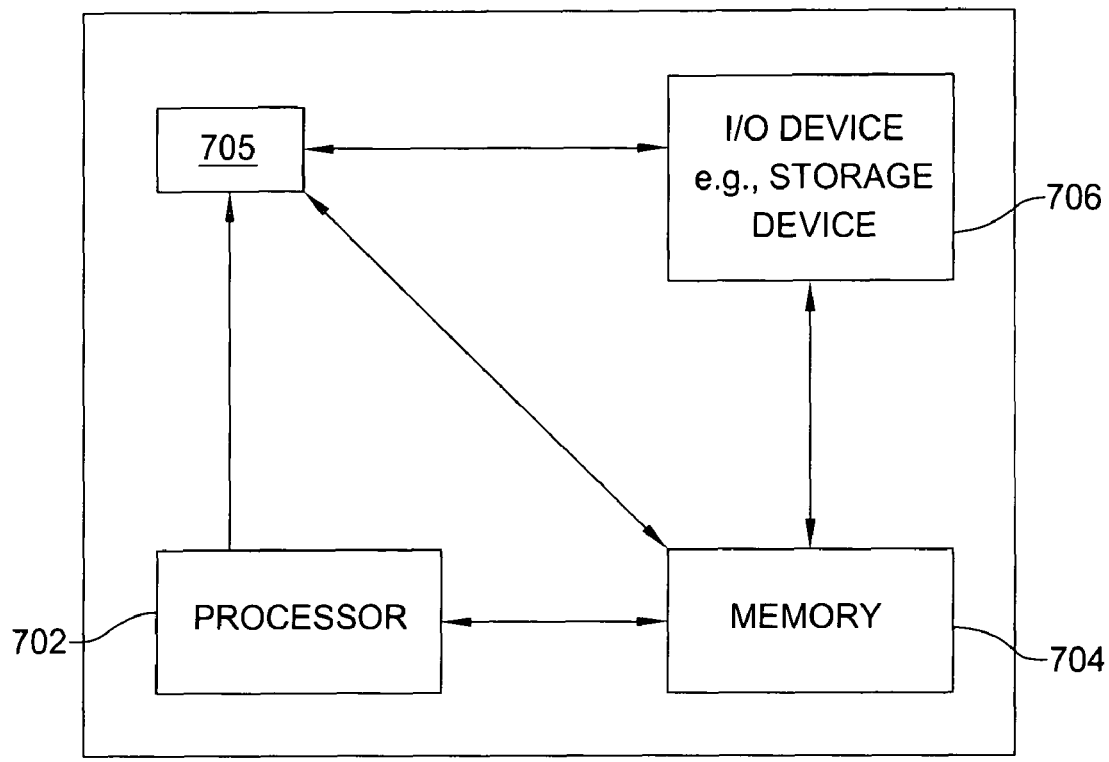
FIG. 7 depicts a high-level block diagram of a general-purpose computer suitable for use in performing the functions described herein.

FIG. 7 depicts a high-level block diagram of a general purpose computer suitable for use in performing the functions described herein. As depicted in FIG. 7, system 700 comprises a processor element 702 (e.g., a CPU), a memory 704, e.g., random access memory (RAM) and/or read only memory (ROM), a packet distribution control module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present packet distribution control module or process 705 can be loaded into memory 704 and executed by processor 702 to implement the functions as discussed above. As such, packet distribution control process 705 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for balancing traffic in a load-balancing network comprising a plurality of nodes, comprising:
    determining a status of the plurality of nodes wherein a first portion of designated ones of the plurality of nodes comprises uncongested nodes, and a second portion of the designated ones of the plurality of nodes comprises congested nodes;
    splitting a traffic flow into a plurality of traffic flow parts associated with designated ones of the plurality of nodes using determined node congestion status information to achieve a first average traffic volume split across each of the uncongested nodes in the first portion of the designated ones of the plurality of nodes that is greater than a second average traffic volume split across each of the congested nodes in the second portion of the designated ones of the plurality of nodes, wherein, for each of at least one of the plurality of nodes, the node congestion status information enables a determination as to whether at least one queue of the node has a congestion condition associated therewith, the at least one queue of the node comprising at least one of:
        a queue associated with traffic distributed in a first traffic distribution round, wherein distributing traffic in the first traffic distribution round comprises splitting traffic entering the load-balancing network for distribution toward at least a portion of the plurality of nodes; or
        a queue associated with traffic routed in a second traffic distribution round, wherein routing traffic in the second traffic distribution round comprises routing traffic received during a first traffic distribution toward at least one of the plurality of nodes; and
    distributing the traffic flow parts toward the designated ones of the plurality of nodes in a first traffic distribution round.

2. The method of claim 1, wherein the node congestion status information is determined using status messages received from the nodes, wherein each of the plurality of nodes for which a first status message is received is identified as a congested node, wherein each of the plurality of nodes for which no status message or a second status message is received is identified as an uncongested node.

3. The method of claim 2, wherein the first status message is generated in response to a determination that a first threshold is satisfied.

4. The method of claim 3, wherein the second status message is generated in response to a determination that a second threshold is satisfied.

5. The method of claim 4, wherein the first threshold comprises a first queue utilization level and the second threshold comprises a second queue utilization threshold, wherein the first queue utilization threshold is greater than the second queue utilization threshold.

6. The method of claim 1, wherein the designated ones of the plurality of nodes comprise uncongested nodes.

7. A method for balancing traffic in a load-balancing network comprising a plurality of nodes, at least a portion of the nodes adapted for distributing traffic in a first traffic distribution round, at least a portion of the nodes adapted for routing traffic in a second traffic distribution round, wherein distributing traffic in the first traffic distribution round comprises splitting traffic entering the load-balancing network for distribution toward at least a portion of the nodes, wherein routing traffic in the second traffic distribution round comprises routing traffic received during a first traffic distribution toward at least one of the nodes, the method comprising:
    determining a status of the plurality of nodes wherein a first portion of designated ones of the plurality of nodes comprises uncongested nodes, and a second portion of the designated ones of the plurality of nodes comprises congested nodes;
    splitting a traffic flow into a plurality of traffic flow parts associated with first designated ones of the nodes using determined node congestion status information, to achieve a first average traffic volume split across each of the uncongested nodes in the first portion of the designated ones of the plurality of nodes that is greater than a second average traffic volume split across each of the congested nodes in the second portion of the designated ones of the plurality of nodes, wherein, for each of at least one of the plurality of nodes, the node congestion status information enables a determination as to whether at least one queue of the node has a congestion condition associated therewith, the at least one queue of the node comprising at least one of:
        a queue for queuing traffic awaiting distribution in a first traffic distribution round;
        a queue for queuing traffic received during a first traffic distribution round;
        a queue for queuing traffic awaiting routing in a second traffic distribution round; or
        a queue for queuing traffic received during a second traffic distribution round; and
    distributing the traffic flow parts toward the designated ones of the plurality of nodes in a first traffic distribution round.

8. A method for balancing traffic in a load-balancing network comprising a plurality of nodes, comprising:
    determining a status of the plurality of nodes wherein a first portion of designated ones of the plurality of nodes comprises uncongested nodes, and a second portion of the designated ones of the plurality of nodes comprises congested nodes;
    splitting a traffic flow into a plurality of traffic flow parts associated with designated ones of the plurality of nodes using determined node congestion status information, to achieve a first average traffic volume split across each of the uncongested nodes in the first portion of the designated ones of the plurality of nodes that is greater than a second average traffic volume split across each of the congested nodes in the second portion of the designated ones of the plurality of nodes,
    monitoring, at one of the nodes, a current queue utilization associated with a queue maintained on the one of the nodes, the queue comprising at least one of:
        a queue associated with traffic distributed in a first traffic distribution round, wherein distributing traffic in the first traffic distribution round comprises splitting traffic entering the load-balancing network for distribution toward at least a portion of the plurality of nodes;

or
a queue associated with traffic routed in a second traffic distribution round, wherein routing traffic in the second traffic distribution round comprises routing traffic received during a first traffic distribution toward at least one of the plurality of nodes;

generating a status message in response to a determination that the current queue utilization satisfies at least one threshold; and propagating the status message from the one of the nodes toward at least one of the nodes, wherein the status message is adapted for use by the at least one of the nodes for splitting traffic received at the at least one of the nodes for distribution during a first traffic distribution round.

9. The method of claim 8, wherein generating the status message comprises:

generating a first status message indicative that the one of the nodes is congested in response to a determination that the current queue utilization satisfies a first threshold.

10. The method of claim 9, wherein generating the status message comprises:

generating a second status message indicative that the one of the nodes is uncongested in response to a determination that the current queue utilization satisfies a second threshold.

11. The method of claim 10, wherein the first threshold comprises a first queue utilization level and the second threshold comprises a second queue utilization threshold, wherein the first queue utilization threshold is greater than the second queue utilization threshold.

12. The method of claim 8, wherein the status message is propagated to each of the plurality of nodes, the method further comprising:

receiving, at each of the plurality of nodes, the status message; and updating, at each of the plurality of nodes, a congestion status associated with the one of the plurality of nodes from which the status message is received.

13. The method of claim 12, further comprising:

at each of the plurality of nodes, splitting a traffic flow received by the node into the plurality of traffic flow parts associated with designated ones of the plurality of nodes, the traffic flow split according to a plurality of congestion statuses associated with the respective plurality of nodes.

14. The method of claim 8, further comprising:

receiving a traffic flow at the one of the nodes;

splitting the traffic flow into a plurality of traffic flow parts associated with designated ones of the plurality of nodes, wherein the traffic flow is split using node congestion status information associated with at least a portion of the plurality of nodes; and distributing the traffic flow parts to the designated ones of the plurality of nodes in a first traffic distribution round.

15. The method of claim 8, wherein, the designated ones of the plurality of nodes comprise uncongested nodes.

16. An apparatus for balancing traffic in a load-balancing network comprising a plurality of nodes, comprising:

means for determining a status of the plurality of nodes wherein a first portion of designated ones of the plurality of nodes comprises uncongested nodes, and a second portion of the designated ones of the plurality of nodes comprises congested nodes;

means for splitting a traffic flow into a plurality of traffic flow parts associated with designated ones of the plurality of nodes using determined node congestion status information, to achieve a first average traffic volume split across each of the uncongested nodes in the first portion of the designated ones of the plurality of nodes that is greater than a second average traffic volume split across each of the congested nodes in the second portion of the designated ones of the plurality of nodes, wherein, for each of at least one of the plurality of nodes, the node congestion status information enables a determination as to whether at least one queue of the node has a congestion condition associated therewith, the at least one queue of the node comprising at least one of:

a queue associated with distributing of traffic in a first traffic distribution round, wherein distributing traffic in the first traffic distribution round comprises splitting traffic entering the load-balancing network for distribution toward at least a portion of the plurality of nodes; or a queue associated with routing of traffic in a second traffic distribution round, wherein routing traffic in the second traffic distribution round comprises routing traffic received during the first traffic distribution toward at least one of the plurality of nodes; and means for distributing the traffic flow parts toward the designated ones of the plurality of nodes in the first traffic distribution round.

* * * * *